United States Patent Office 3,067,164
Patented Dec. 4, 1962

3,067,164
COMPOSITIONS OF ALKENYL AROMATIC HYDROCARBON - ACRYLONITRILE COPOLYMERS AND BUTADIENE - ACRYLONITRILE - UNSATURATED KETONE RUBBERS
Henno Keskkula and George B. Sterling, Midland, and Cleown A. Leatherman, Shepherd, Mich., assignors to The Dow Chemical Company, Midland, Mich., a corporation of Delaware
No Drawing. Filed Dec. 23, 1958, Ser. No. 782,367
13 Claims. (Cl. 260—45.5)

This application is a continuation-in-part application of our copending application Serial No. 638,212, filed February 5, 1957, now abandoned.

This invention concerns new compositions of matter consisting essentially of a predominant amount of one or more thermoplastic alkenyl aromatic hydrocarbon-acrylonitrile copolymers intimately incorporated with a butadiene-acrylonitrile-unsaturated ketone rubber. It relates more particularly to such compositions having a combination of desirable properties such as good molding characteristics, high impact strength and elongation and excellent color.

Compositions which are blends of resinuous copolymers of styrene and acrylonitrile and rubbery copolymers of acrylonitrile and butadiene are known. The compositions are known to possess good solvent resistance and to have desirable properties above and beyond those of the individual polymeric constituents.

However, these compositions have been found to be deficient in certain combinations of properties such as color, moldability or uniformity, or mechanical properties, notable impact strength, elongation or heat distortion temperature.

It is a primary object of the invention to provide new compositions of matter consisting essentially of a predominant amount of one or more thermoplastic resinous copolymers of an alkenyl aromatic hydrocarbon and acrylonitrile intimately blended with a ternary butadiene-acrylonitrile-unsaturated ketone rubber or polymeric elastomer, which compositions possess a combination of superior properties, including good color, moldability and uniform dispersion of the polymer ingredients with one another, together with improvement in one or more of the properties tensile strength, impact strength, elongation, heat distortion temperature or resistance to discoloring upon exposure to air or oxygen and light. A specific object is to provide such compositions consisting essentially of a blend of a thermoplastic copolymer of styrene and acrylonitrile intimately incorporated with a ternary polymeric elastomer of butadiene, acrylonitrile and methyl isopropenyl ketone. Other and related objects may appear from the following description of the invention.

According to the invention the foregoing and related objects are obtained by blending a normally hard thermoplastic resinuous copolymer of from 70 to 90 percent by weight of one or more alkenyl aromatic hydrocarbons and from 30 to 10 percent of acrylonitrile with an elastomeric relatively soft ternary copolymer of a predominant amount of butadiene and lesser amounts of acrylonitrile and an unsaturated ketone having the general formula:

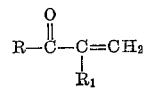

wherein R represents the methyl or ethyl radical and $R_1$ is hydrogen or the methyl radical, to obtain a homogenous or substantially homogenous composition having the polymeric ingredients intimately incorporated with one another in proportions as hereinafter defined.

It has been discovered that elastomeric ternary copolymers of butadiene-acrylonitrile and an unsaturated ketone embraced by the above general formula such as methyl vinyl ketone, ethyl vinyl ketone, ethyl isopropenyl ketone or methyl isopropenyl ketone, which copolymers contain from 60 to 80 percent by weight of butadiene, from 10 to 30 percent of acrylonitrile and from 10 to 25 percent of the unsaturated ketone in chemically combined form, and having the proportions of acrylonitrile to unsaturated ketone within the range of from 0.5:1 to 3:1, can readily be incorporated with hard thermoplastic copolymers of one or more monoalkenyl aromatic hydrocarbons and acrylonitrile to obtain compositions having a combination of desirable properties. Such compositions are not only superior in one or more of the properties tensile strength, impact strength, elongation, heat distortion temperature or flow characteristics at elevated temperatures and pressures, but have also been found to have improved color and greater resistance to discoloring or deterioration in the presence of air or oxygen at ordinary or elevated temperatures such as heat-plastifying temperatures, e.g. at compounding or molding temperatures, than have compositions prepared from the alkenyl aromatic hydrocarbon acrylonitrile copolymers and binary elastomeric copolymers of butadiene and acrylonitrile, under otherwise similar conditions. The elastomeric ternary copolymers employed in the invention are more compatible with the alkenyl aromatic hydrocarbon acrylonitrile copolymers than are the binary elastomeric copolymers of butadiene and acrylonitrile. The ternary copolymers can readily be incorporated with the alkenyl aromatic hydrocarbon acrylonitrile copolymers in substantially greater proportions to obtain compositions having a smooth texture for processing and which compositions can be molded at lower temperatures and in usual ways, e.g. by compression or injection molding operations or by extrusion processes, to yield molded articles having a smoother more even surface, and improved impact strength, particularly at low temperatures, than is obtained when employing a binary copolymer of butadiene and acrylonitrile.

The compositions of the invention contain the polymeric starting materials intimately incorporated with one another in proportions within the range of from 45 to 80 percent by weight of the thermoplastic alkenyl aromatic hydrocarbon acrylonitrile copolymer and correspondingly from 55 to 20 percent of the elastomeric ternary copolymer of butadiene, acrylonitrile and unsaturated ketone, and in amounts such that the composition contains between 12 and 33, preferably from 15 to 27 percent by weight of chemically combined butadiene, based on the total weight of said polymeric ingredients in the composition. The total weight of the polymeric ingredients constitutes at least 90 percent of the weight of the compositions, any balance being made up of miscellaneous ingredients or additives such as pigments, colors, stabilizing agents, antioxidants, lubricants, flow agents, mold release agents, plasticizers, etc., although such additives are not required in the invention.

The alkenyl aromatic hydrocarbon acrylonitrile polymers to be employed as starting material can be a polymer containing in chemically combined form from 10 to 30 percent by weight of acrylonitrile and from 90 to 70 percent of a monoalkenyl aromatic hydrocarbon, e.g. styrene, vinyltoluene, vinylxylene, ethylvinylbenzene, isopropylstyrene or alpha-methyl styrene, or mixtures of styrene and any one or more of such monoalkenyl aromatic hydrocarbons. The polymers are normally solid thermoplastic resins having molecular weights corresponding to a viscosity characteristic for the polymer of from 6 to 40 centipoises as determined for a 10 weight percent solution of the copolymer in methyl ethyl ketone at 25° C. The copolymers of acrylonitrile and a monoalkenyl aromatic hydrocarbon can be prepared by procedure described in U.S. Patent No. 2,739,142. In brief, the copolymers of acrylonitrile and an alkenyl aromatic hydrocarbon, e.g. styrene, can be prepared by feeding a mixture of the monomers, together with from 5 to 15 percent by weight of an inert liquid such as ethylbenzene or isopropylbenzene, into admixture with a relatively large reacting body of liquid consisting of the monomers, the inert liquid and the copolymer being formed maintained in a reaction zone such as a recirculating coil at a substantially constant polymerization temperature between 90° and 150° C. and vigorously agitated so that the monomers fed to the reaction are rapidly dispersed in the reacting mass and are quickly brought to the temperature of the mass and continuously withdrawing from said reaction zone liquid consisting of the copolymer dissolved in the monomers and inert liquid in a concentration between about 20 and 60 percent by weight of the liquid, and at approximately the rate at which materials are fed to the reaction and separating the copolymer from the unreacted monomers and inert liquid.

The elastomeric ternary copolymers to be employed are copolymers of from 60 to 80 percent by weight of butadiene, from 10 to 30 percent of acrylonitrile and from 10 to 25 percent of an unsaturated ketone having the aforementioned general formula such as methyl vinyl ketone, methyl isopropenyl ketone, etc., based on 100 parts by weight of the copolymer, and having the proportions of acrylonitrile and the unsaturated ketone in a ratio to one another of from 0.5:1 to 3:1. These ternary rubber-like copolymers form compositions with normally hard thermoplastic styrene-acrylonitrile copolymers having one or more superior properties such as elongation, impact strength, moldability, color or smooth surface of molded articles, compared to compositions of styrene acrylonitrile copolymers and binary butadiene acrylonitrile rubbers, prepared under otherwise similar conditions.

The elastomeric ternary copolymers can be prepared by polymerization of the monomers in aqueous emulsion systems, in the presence or absence of chain-transfer agents such as lauryl mercaptan or tert. $C_{12}$ to $C_{16}$ mercaptans or other fatty mercaptans to activate the catalyst or to modify the copolymer. The polymerization can be carried out at temperatures between 1° and 80° C. and is usually continued until polymerization of the monomers is complete or substantially complete. The copolymer can be recovered from the synthetic latex in usual ways such as by coagulation, washing and drying of the copolymer or by evaporating the water from the latex, e.g. by drum drying or spray drying the latex.

The elastomeric ternary copolymer can have a gel content between 50 and 98, preferably from 60 to 85, percent of the weight of the copolymer and a Mooney number between 30 and 150, preferably from 40 to 125. The gel content of the ternary copolymer can readily be determined by placing a 0.2 gram sample of the copolymer in 100 ml. of methyl ethyl ketone and allowing the mixture to stand at room temperature for 24 hours without agitating, separating the undissolved material by filtering through a 300 mesh per inch U.S. Standard metal screen, drying the insoluble material and determining the amount of the insoluble gel. The gel content is the ratio of the weight of the insoluble dried material over the weight of the original sample.

The compositions are prepared by blending the polymeric components into a uniform or homogenous mass in usual ways, e.g. by mechanically working the heat-plastified materials with one another on compounding rolls, a Banbury mixer or a plastics extruder.

In practice the polymeric components are heat-plastified and intimately incorporated with one another in the desired proportions on compounding rolls, a Banbury mixer or a plastics extruder at temperatures between 160° and 240° C. The milling operation is continued until a uniform composition is obtained. The milling should not be excessively prolonged at elevated temperatures, i.e. it should not be extended for more than 20 to 40 minutes at conventional milling speeds and gaps, in order to avoid discoloring of the product or degradation of its properties. Usually a milling or compounding time of from 1 to 10 minutes is satisfactory. Thereafter, the product is cooled and cut or ground to a granular form suitable for molding.

In preparing the compositions, best results are usually obtained by incorporating the ternary elastomeric copolymers having the greater proportions of butadiene chemically combined therein with the resinous copolymers containing the smaller proportion of chemically combined acrylonitrile. The ternary copolymers containing from about 70 to 80 percent by weight of chemically combined butadiene are preferably blended with the hard resinous copolymers containing from about 10 to 20 percent by weight of chemically combined or copolymerized acrylonitrile, and from 90 to 80 percent of the alkenyl aromatic hydrocarbon, e.g. styrene, within the ranges and proportions herein specified to obtain compositions possessing a plurality of desirable properties. Conversely, the ternary copolymers of lower butadiene content, e.g. containing from 60 to about 70 percent by weight of butadiene, together with from 10 to 30 percent of acrylonitrile and from 10 to 25 percent of the unsaturated ketone, in a ratio to one another between 0.5:1 to 3:1, are preferably blended with the resinous copolymers of from 70 to about 80 percent by weight of styrene and from about 20 to 30 percent of acrylonitrile, in the proportions stated.

Small amounts of additives such as pigments, stabilizers, antioxidants, plasticizers, lubricants, etc., may be incorporated with the polymeric components. When used, such additives are employed in amounts of from 1 to 10 percent by weight of the final composition. It is usually advantageous to employ small amounts of such additives, but they are not required in the invention.

The following examples illustrate ways in which the principle of the invention has been applied, but are not to be constructed as limiting its scope.

EXAMPLE 1

A. In each of a series of experiments, a rubbery copolymer of butadiene, acrylonitrile and methyl isopropenyl ketone in proportions are stated in the following table was prepared by polymerizing a mixture of the monomers in an aqueous emulsion employing the following recipe:

| Ingredients: | Parts by weight |
|---|---|
| Monomers | 100 |
| Water | 122 |
| Sulfonate AA9 (dodecylbenzene sulfonate, sodium salt) | 2 |
| Tert.-dodecyl mercaptan | 0.2 |
| $NaHCO_3$ | 1 |
| Potassium persulfate | 1.5 |

The ingredients were charged to a reaction vessel. The mixture was agitated to effect emulsification, then heated with mild agitation at a temperature of 60° C. under the autogenous pressure of the mixture of the materials until the monomers were substantially polymerized. The product was obtained as a synthetic latex or aqueous colloidal dispersion of the copolymer. The latex was heated at a temperature of 100° C. while bubbling steam therethrough at atmospheric pressure for a period of one hour to decompose residual amounts of the potassium persulfate catalyst and remove residual traces of unreacted monomer, then cooled. Thereafter, there was mixed with the latex 2 percent by weight, based on the weight of the polymer, of tris-(para-dodecylphenyl)phosphite and 2 percent of N,N,N',N'-tetra-(2-hydroxypropyl)ethylene diamine, as stabilizing agents, by dispersing said compounds in water containing a small amount of an emulsifying agent and adding the aqueous emulsion of the agents to the latex. The polymer was recovered by spreading a thin layer of the stabilized latex on the surface of rolls heated at a temperature of 150° C., evaporating the water from the layer and scraping the dried latex solids from the rolls. The rubbery polymer was recovered in the form of shreds.

B. In each of a series of experiments, 73 parts by weight of a hard copolymer of 70 percent by weight of styrene and 30 percent of acrylonitrile, which copolymer had a viscosity characteristic of 12 centipoises as determined for a 10 weight per cent solution of the copolymer in methyl ethyl ketone at 25° C., was mixed with 25 parts by weight of a ternary copolymer of butadiene, acrylonitrile and methyl isopropenyl ketone, prepared in part A above. The mixture was heat-plastified by milling the same on a pair of compounding rolls, one of which rolls was heated at a temperature of 340° F. and the other at 290° F. for a period of about 6 minutes. Two parts by weight of tri(2-ethylhexyl)phosphate was added to the heat-plastified ingredients as plasticizer. The resulting materials were compounded on the heated rolls for a period of 10 minutes to obtain a uniform composition. The composition was removed from the rolls and allowed to cool to room temperature. The product was cut to a granular form suitable for molding. Portions of the product were injection molded to form test bars of ½ x ⅛ inch cross section by 6½ inches long. The test pieces were molded on a standard plastics injection molding machine having a tunnel capacity such that the polymeric composition was heated therein for a period of about 200 seconds when the machine was operated on a 45 second cycle for molding a test bar. The procedure for molding a test bar to determine a molding temperature characteristic for the composition was to maintain the molding pressure applied to the plastic at a constant value of 10,000 pounds per square inch and change the temperature at which the plastic was heated until the flow rate of the plastic under the applied molding pressure was just sufficient to fill the mold cavity in a period of 7 seconds. This temperature was observed and is herein designated "flow temperature." The lower the flow temperature the greater the moldability of the composition. Other portions of the composition were injection molded under an applied pressure of 10,000 pounds per square inch and at a temperature of 25° F. above the flow temperature to form test pieces. These test pieces were used to determine the tensile strength and percent elongation values for the composition employing procedures similar to those described in ASTM 638–49T. The impact strength was determined by procedure similar to that described in ASTM D256–47T. The heat distortion temperature was determined by procedure similar to that described by Heirholzer and Boyer, see ASTM Bull. No. 134 of May 1945, employing test bars of ⅛ x ½ inch cross section by 2½ inches long. Rockwell superficial hardness was determined by procedure similar to that described in ASTM D785–51T. Table I identifies the composition by naming the polymeric ingredients and giving the proportions of monomers employed in making the same. The table also gives the properties determined for the composition or product.

For purpose of comparison compositions containing similar proportions of polymeric ingredients were prepared from a copolymer of styrene and acrylonitrile and a binary copolymer of butadiene and acrylonitrile and a copolymer of styrene and acrylonitrile and a binary copolymer of butadiene and methyl isopropenyl ketone, which compositions are outside the scope of the invention, and the compositions tested in the same way. The results are included in the table as runs Nos. 1 and 6. In the table, the formula $C_4H_6$ designates butadiene, VCN is acrylonitrile and MIK is methyl isopropenyl ketone, for brevity.

*Table I*

| Run No. | Starting materials | | | | | Product | | | | | | |
|---|---|---|---|---|---|---|---|---|---|---|---|---|
| | Hard polymer | | Rubbery polymer | | | Tensile strength, lbs./sq. in. | Elongation, Percent | Notched impact strength, ft.-lbs. | Heat distortion temp, °C. | Rockwell hardness, 15x | Flow temp., °F. | Color |
| | Styrene, Percent | VCN, Percent | $C_4H_6$, Percent | VCN, Percent | MIK, Percent | | | | | | | |
| 1 | 70 | 30 | 60 | 40 | 0 | 5,760 | 23.5 | 1.6 | 82 | 125-172 | 490 | Light tan. |
| 2 | 70 | 30 | 60 | 30 | 10 | 5,600 | 57.2 | 3.3 | 82 | 123-171 | 475 | Do. |
| 3 | 70 | 30 | 60 | 25 | 15 | 5,870 | 64.1 | 5.7 | 85 | 122-171 | 470 | Light ivory. |
| 4 | 70 | 30 | 60 | 20 | 20 | 5,920 | 74.9 | 7.4 | 86 | 121-170 | 465 | Do. |
| 5 | 70 | 30 | 60 | 15 | 25 | 6,290 | 42.3 | 2.7 | 86 | 113-165 | 455 | Do. |
| 6 | 70 | 30 | 60 | 0 | 40 | 5,470 | 4.0 | 0.8 | 82 | 77-140 | 435 | Ivory. |

EXAMPLE 2

A. In each of a series of experiments, a rubbery butadiene copolymer was prepared from monomeric ingredients in proportions as stated in the following table, employing a recipe and polymerizing conditions similar to those employed in part A of Example 1. The latex was mixed with stabilizing agents and the rubber copolymer recovered by evaporating the water on heated rolls as previously described.

B. In each of a series of experiments, 73 parts by weight of a hard copolymer of styrene and acrylonitrile containing chemically combined or interpolymerized styrene and acrylonitrile in proportions as stated in the following table was heat-plastified and milled with 25 parts by weight of a rubbery butadiene copolymer prepared in part A above and 2 parts by weight of tri(2-ethylhexyl)phosphate as plasticizer on a pair of compounding rolls heated at 340° F. and 290° F., respectively, for a period of about 10 minutes. The composition was removed from the rolls, allowed to cool and ground to a granular form. Portions of the composition were molded to form test pieces. The properties for the composition were determined employing procedures similar to those employed in Example 1. Table II identifies the composition by naming the polymeric ingredients and giving the proportions of the monomers employed in preparing the starting polymeric materials. The table also gives the properties determined for the composition or product.

Table II

| Run No. | Starting materials | | | | | Product | | | | | |
|---|---|---|---|---|---|---|---|---|---|---|---|
| | Hard polymer | | Rubbery polymer | | | Tensile strength, lbs./sq. in. | Elongation, percent | Notched impact strength, ft.-lbs. | Heat distortion temp., °C. | Rockwell hardness, 15x | Flow temp., °F. |
| | Styrene, percent | VCN, percent | $C_4H_6$, percent | VCN, percent | MIK, percent | | | | | | |
| 1 | 70 | 30 | 60 | 20 | 20 | 5,920 | 74.9 | 7.4 | 86 | 122–170 | 465 |
| 2 | 70 | 30 | 65 | 17.5 | 17.5 | 5,950 | 34.6 | 3.1 | 89 | 123–173 | 455 |
| 3 | 70 | 30 | 70 | 15 | 15 | 5,670 | 34.0 | 2.5 | 87 | 112–160 | 450 |
| 4 | 85 | 15 | 65 | 17.5 | 17.5 | 5,220 | 53.9 | 4.9 | 79 | 109–161 | 435 |
| 5 | 85 | 15 | 70 | 15 | 15 | 4,930 | 46.4 | 6.3 | 78 | 99–154 | 435 |
| 6 | 85 | 15 | 80 | 10 | 10 | 4,220 | 46.3 | 7.5 | 81 | 105–160 | 450 |

EXAMPLE 3

A. A rubbery copolymer was prepared by polymerizing a monomer mixture of 60 percent by weight of butadiene, 20 percent of methyl isopropenyl ketone and 20 percent of acrylonitrile in aqueous emulsion employing the following recipe:

Ingredients: Parts by weight
- Monomers _____ 100
- Water _____ 125
- Duponol WAQ (fatty alcohol sodium sulfate, 30 percent paste) _____ 3
- Tert.-dodecyl mercaptan _____ 0.2
- $NaHCO_3$ _____ 1
- Potassium persulfate _____ 0.75

The ingredients were charged to a reaction vessel and agitated to effect emulsification. The mixture was then heated at a temperature of 60° C. with mild agitation under the autogenous pressure of the mixture of the materials until the monomers were substantially polymerized as indicated by a lowering of the pressure in the polymerization vessel to a constant value. The product was obtained as a synthetic latex of the copolymer. The latex was heated at a temperature of 100° C. while passing steam at atmospheric pressure through the latex for a period of one hour to decompose residual amounts of the potassium persulfate catalyst and to distill and separate residual amounts of unreacted monomers therefrom, then was cooled. A test portion of the latex was analyzed to determine the percent of copolymer therein. Thereafter, there was mixed with the latex 4 percent, based on the weight of the copolymer, of 2,4-dimethyl-6-(1-methylcyclohexyl)phenol. The copolymer was recovered by drum drying the stabilized latex.

B. In each of a series of experiments, a charge of a thermoplastic copolymer of 70 percent by weight of styrene and 30 percent of acrylonitrile, which copolymer had a viscosity characteristic of 12 centipoises as determined for a 10 weight percent solution of the copolymer in methyl ethyl ketone at 25° C., and a charge of the rubbery copolymer of butadiene, methyl isopropenyl ketone and acrylonitrile prepared in part A above in proportions as stated in the following table were heat-plastified and mechanically worked in admixture with one another at temperatures between 260° and 340° F. in a Banbury mixer for a period of ten minutes. Thereafter, two percent by weight of tri-(2-ethylhexyl)phosphate, based on a total weight of the composition of 1000 grams, was added to the heat-plastified polymeric ingredients. The resulting mixture was blended in the Banbury mixer for a period of 6 minutes, then was removed, allowed to cool and was ground to a granular form. Portions of the product were injection molded to form test pieces. These test pieces were used to determine properties for the product employing procedures similar to those employed in Example 1. Table III identifies the composition by giving the proportions of the polymeric ingredients employed in making the same. The table also gives the properties determined for the product. All of the compositions had flow temperatures between 460° and 480° F., a smooth surface and a light color.

Table III

| Run No. | Starting materials | | Tensile strength, lbs/sq. in. | Elongation, percent | Notched impact strength at— | | | | Heat distortion temp, °C. | Rockwell hardness, 15x | Flow temp., °F. |
|---|---|---|---|---|---|---|---|---|---|---|---|
| | Hard polymer, percent | Rubbery polymer, percent | | | 73° F. | 32° F. | 0° F. | −20° F. | | | |
| 1 | 80 | 20 | 6,770 | 28.2 | 4.2 | 1.5 | 0.9 | 0.6 | 85 | 126–173 | 460 |
| 2 | 75 | 25 | 5,360 | 40.3 | 11.1 | 2.9 | 1.9 | 1.1 | 87 | 113–165 | 460 |
| 3 | 70 | 30 | 4,620 | 45.1 | 15.3 | 6.4 | 2.6 | 1.7 | 85 | 99–155 | 460 |
| 4 | 65 | 35 | 3,820 | 60.2 | 15.8 | 12.9 | 6.1 | 1.9 | 84 | 75–139 | 460 |
| 5 | 60 | 40 | 3,260 | 39.9 | 15.3 | 13.6 | 7.0 | 4.1 | 84 | 50–120 | 460 |
| 6 | 55 | 45 | 2,569 | 45.3 | 14.7 | 15.9 | 14.8 | 7.7 | 81 | 11–95 | 470 |
| 7 | 50 | 50 | 2,100 | 43.6 | 14.0 | 16.3 | 17.4 | 13.9 | 81 | −35–55 | 475 |
| 8 | 45 | 55 | 1,700 | 47.2 | 12.9 | 13.8 | 18.9 | 20.3 | 78 | | 480 |

EXAMPLE 4

A. In each of a series of experiments, a mixture of 60 percent by weight of butadiene, 20 percent of acrylonitrile and 20 percent of methyl isopropenyl ketone was polymerized to form a synthetic latex employing the following recipe:

Ingredients: Parts by weight
- Butadiene _____ 60
- Acrylonitrile _____ 20
- Methyl isopropenyl ketone _____ 20
- Water _____ 125
- Duponol SAQ (fatty alcohol, sodium sulfate, 30 percent paste) _____ 3
- Tert.-dodecyl mercaptan _____ 0–1
- $NaHCO_3$ _____ 1
- Potassium persulfate _____ 1.5

The ingredients were charged to a reaction vessel. The mixture was agitated to effect emulsification, then heated with mild agitation at a temperature of 60° C. under the autogenous pressure of the mixture of materials until the monomers were polymerized. The resulting latex was heated at a temperature of 100° C. while bubbling steam therethrough for a period of one hour to decompose residual amounts of the persulfate catalyst and distill unreacted monomers from the latex. The latex was cooled and analyzed to determine the proportion of copolymer therein. Thereafter, an emulsion consisting of 55 parts by weight of water, 3 parts of oleic acid, 1 part of diisopropanolamine, 5.4 parts of ethylbenzene, 15.6 parts of methylene chloride and 20 parts of 2,4-dimethyl-6-(1-methylcyclohexyl)phenol as stabilizer was mixed with the latex in amount corresponding to 5 percent of the 2,4-dimethyl - 6 - (1 - methylcyclohexyl)phenol based on the weight of the copolymer. The stabilized latex was dried to recover the copolymer. A portion of the dried copolymer was heat-plastified on compounding rolls and milled to form a sheet ⅜ inch thick, then removed from the rolls and cooled. Test pieces were cut from the sheet and used to determine a viscosity characteristic or Mooney number for the copolymer employing procedure similar to that described in ASTM D927-55T. Other portions of the copolymer were used to determine the percent of gel therein. The procedure for determining the percent of gel was to add 0.2 gram of the copolymer to 100 cc. of methyl ethyl ketone and allow the mixture to stand in darkness at room temperature without agitation for a period of 24 hours. Thereafter, the mixture was filtered through a 300 mesh per inch U.S. Standard metal screen and the residue dried and weighed. The loss in weight represents the soluble or non-gelled polymer. The percent of gel was calculated as the ratio of the weight of the insoluble dried material divided by the weight of the sample and multiplied by 100. The percent of gel and a Mooney number for the rubbery copolymer are given in the following table. The table also gives the percent of tertiary mercaptan employed in the polymerization, based on the weight of the monomers initially used.

B. Particles of the dried rubbery copolymer were blended with granules of a copolymer of 70 percent by weight of styrene and 30 percent of acrylonitrile, having a viscosity characteristic of 11 centipoises as determined for a 10 weight percent solution of the copolymer in methyl ethyl ketone at 25° C., in proportions corresponding to 26.3 parts by weight of the rubbery copolymer to 71.7 parts of the styrene-acrylonitrile copolymer. The mixture of the copolymers was fed to a plastics extruder wherein it was heat-plastified and mechanically worked in admixture with 2 percent by weight of tri-(2-ethylhexyl)phosphate, also fed to the extruder, and at temperatures between 190° and 220° C. for a period of from 1.5 to 3 minutes, then was extruded, cooled and ground to a granular form. The product was a composition having the ingredients intimately incorporated with one another. Portions of the product were molded and tested employing procedures similar to those employed in Example 1. Table IV identifies the experiments and gives the gel content and Mooney number for the rubbery copolymer. The table also gives the properties determined for the product.

heat-plastified copolymer of 70 percent by weight of styrene and 30 percent of acrylonitrile and 2 parts by weight of tri-(2-ethylhexyl) phosphate as plasticizer. The copolymers of styrene and acrylonitrile employed in the experiments had molecular weights corresponding to viscosity characteristics determined on a 10 weight percent solution of a copolymer in methyl ethyl ketone at 25° C. as stated in the following table. The polymeric ingredients and plasticizer were milled on compounding rolls at temperatures between 290° and 340° F. for a period of about 6 minutes, then removed, allowed to cool and the product cut to a granular form suitable for molding. Portions of the product were molded to form test pieces which were used to determine properties for the composition. The procedures for determining the properties for the product were similar to those employed in Example 1. Table V identifies the experiments and gives a viscosity characteristic for the styrene-acrylonitrile copolymer. The table also gives the properties determined for the product.

Table V

| Run No. | Starting materials | | Product | | | |
|---|---|---|---|---|---|---|
| | Rubbery copolymer, parts, Percent | Styrene-acrylonitrile, co-viscosity, cps. | Tensile strength, lbs./sq.in. | Elongation, Percent | Notched impact strength, ft.-lbs. | Flow temp., °F. |
| 1 | 25 | 6 | 5,540 | 28.3 | 5.7 | 425 |
| 2 | 25 | 8.2 | 5,550 | 56.2 | 6.2 | 435 |
| 3 | 25 | 11.0 | 5,550 | 61.8 | 8.4 | 455 |
| 4 | 25 | 20.9 | 5,600 | 59.8 | 11.9 | 485 |

EXAMPLE 6

A charge of 730 grams of a hard thermoplastic copolymer of 70 percent by weight of vinyltoluene and 30 percent of acrylonitrile, which copolymer had a viscosity characteristic of 36 centipoises as determined on a 10 weight percent solution of the copolymer in methyl ethyl ketone at 25° C. was heat-plastified by compounding the same on a pair of heated rolls, one of which rolls was heated at a temperature of 360° F. and the other at a temperature of 260° F. Thereafter, 250 grams of a rubbery copolymer of 60 percent by weight of butadiene, 20 percent of methyl isopropenyl ketone and 20 percent of acrylonitrile, similar to that described in part A of Example 3 was added. The polymeric ingredients were compounded together for a period of 5 minutes. Ten grams of tri-(2-ethylhexyl) phosphate and 10 grams of Acrawax, a synthetic wax having a melting point of Table IV

| Run No. | Rubbery starting copolymer | | | Product | | | | |
|---|---|---|---|---|---|---|---|---|
| | Tertiary dodecyl mercaptan, percent | Gel, percent | Mooney number ML1+4 (212° F.) | Tensile strength, lbs./sq. in. | Elongation, percent | Notched impact strength | Heat distortion temp., °C. | Flow temp., °F. |
| 1 | 0 | 97.32 | 145.6 | 4,720 | 13.5 | 1.3 | 86 | 475 |
| 2 | 0.2 | 81.50 | 124 | 4,865 | 27.1 | 3.6 | 84 | 465 |
| 3 | 0.5 | 82.57 | 61 | 5,880 | 34.7 | 10.5 | 88 | 445 |
| 4 | 0.5 | 71.7 | 62 | 5,390 | 46.3 | 11.3 | 83 | 435 |
| 5 | 0.75 | 59.3 | 44 | 5,488 | 24.9 | 3.7 | 86 | 425 |
| 6 | 1.0 | 50.8 | 28 | 4,130 | 5.9 | 2.1 | 83 | 390 |

EXAMPLE 5

In each of a series of experiments, a charge of 25 parts by weight of a stabilized rubbery copolymer of 60 percent by weight of butadiene, 20 percent of acrylonitrile and 20 percent of methyl isopropenyl ketone, prepared by procedure similar to that described in part A of Example 1, was milled with 73 parts by weight of a 95–97° C., were added. The resulting mixture was compounded for a period of 10 minutes, then was removed from the rolls, was allowed to cool and was ground to a granular form. Test pieces of the composition were injection molded and properties for the composition determined employing procedures similar to those employed in Example 1. The composition had the properties:

| Tensile strength | lbs./sq. in__ | 6,150 |
| Elongation | percent__ | 17.7 |
| Notched impact strength | ft.-lbs__ | 2.6 |
| Heat distortion temperature | ° C__ | 79 |
| Rockwell hardness (15x) | | 127–177 |

EXAMPLE 7

A charge of 730 grams of a hard thermoplastic copolymer of 64 percent by weight of alpha-methyl styrene, 28 percent of acrylonitrile and 8 percent of styrene, which copolymer had a viscosity characteristic of 15.4 centipoises as determined for a 10 weight percent solution of the copolymer in methyl ethyl ketone at 25° C., 250 grams of a rubbery copolymer of 60 percent by weight of butadiene, 20 percent of methyl isopropenyl ketone and 20 percent of acrylonitrile, similar to that described in part A of Example 3, together with 10 grams of tri-(2-ethylhexyl) phosphate and 10 grams of Acrawax were compounded into a uniform composition employing procedure similar to that employed in Example 6. Portions of the composition were molded and properties for the composition determined employing procedures similar to those employed in Example 1. The composition had the properties:

| Tensile strength | lbs./sq. in__ | 6,030 |
| Elongation | percent__ | 39.8 |
| Notched impact strength | ft.-lbs__ | 13.1 |
| Heat distortion temperature | ° C__ | 92 |
| Rockwell hardness (15x) | | 121–169 |

EXAMPLE 8

A rubbery copolymer was prepared by polymerizing a mixture of monomers consisting of 60 percent by weight of butadiene, 20 percent of acrylonitrile and 20 percent of methyl vinyl ketone in aqueous emulsion employing a recipe and temperature conditions similar to those employed in part A of Example 3. The latex was mixed with 4 percent by weight, based on the weight of the solids, of 2,4-dimethyl-6-(1-methylcyclohexyl)-phenol as stabilizer, then dried on heated rolls and the copolymer recovered. A charge of 25 parts by weight of the rubbery copolymer, 73 parts of a copolymer of 70 percent by weight of styrene and 30 percent of acrylonitrile and 2 parts of tri-(2-ethylhexyl) phosphate was heat-plastified and compounded on rolls at temperatures between 290° F. and 340° F. for a period of ten minutes. The composition was removed from the rolls, was cooled, and ground to a granular form. The proporties for the composition were determined employing procedures similar to those employed in Example 1. The composition had the properties:

| Tensile strength | lbs./sq. in__ | 4,980 |
| Elongation | percent__ | 57.9 |
| Notched impact strength | fts.-lbs__ | 12.0 |
| Heat distortion temperature | ° C__ | 86 |
| Flow temperature | ° F__ | 490 |

Test pieces of the composition prepared by injection molding the granular product had a smooth surface free from flow marks, a uniform opaque pale tan color and were resistant to discoloring upon heating in an air oven at a temperature of 100° C.

EXAMPLE 9

A rubbery copolymer was prepared by polymerizing a mixture of monomers consisting of 60 percent by weight of butadiene, 20 percent of acrylonitrile and 20 percent of ethyl vinyl ketone in aqueous emulsion employing a recipe and temperature conditions similar to those employed in part A of Example 3. The latex was mixed with 4 percent by weight, based on the weight of the solids, of 2,4-dimethyl-6-(1-methylcyclohexyl)phenol, as stabilizer. The copolymer was recovered by drying the stabilized latex on heated rolls. A charge of 25 parts by weight of the ternary copolymer, 73 parts of a copolymer of 70 percent by weight of styrene and 30 percent of acrylonitrile, which copolymer had a viscosity characteristic of 12 centipoises, and 2 parts of tri-(2-ethylhexyl)phosphate was heat-plastified and milled on a pair of rolls heated at temperatures of 290° F. and 340° F., respectively, for a period of about 6 minutes. A uniform composition was obtained. It was removed from the rolls, was cooled and ground to a granular form. The properties for the composition were determined employing procedures similar to those employed in Example 1. The composition had the properties:

| Tensile strength | lbs./sq. in__ | 4,770 |
| Elongation | percent__ | 49.8 |
| Notched impact strength | ft.-lbs__ | 11.2 |
| Heat distortion temperature | ° C__ | 84 |

EXAMPLE 10

In each of two experiments a mixture of monomers as hereinafter stated was polymerized in aqueous emulsion employing the recipe:

| Ingredients: | Parts by weight |
| --- | --- |
| Monomers | 100 |
| Water | 125 |
| Duponol WAQ (fatty alcohol, sodium sulfate, 30 percent paste) | 3 |
| Tert.-dodecyl mercaptan | 0.5 |
| NaHCO$_3$ | 1 |
| Potassium persulfate | 0.75 |

In experiment A the monomers were a mixture of 60 percent by weight of butadiene and 40 percent by weight of acrylonitrile. In experiment B the monomers were a mixture of 60 percent by weight of butadiene, 20 percent of acrylonitrile and 20 percent of methyl isopropenyl ketone. The ingredients were charged to a reaction vessel and the mixture agitated to effect emulsification. The emulsion was heated at a temperature of 60° C. with mild agitation under the autogenous pressure of the mixture of the materials until the monomers were polymerized. The product was obtained as a synthetic latex. The latex was heated at a temperature of 100° C. while bubbling steam at atmospheric pressure through the latex to decompose residual amounts of the potassium persulfate catalyst. Thereafter, the latex was dried by spreading a layer of the same on rolls heated at a temperature of 150° C., evaporating the water and scraping the dried latex solids from the rolls. The product was a rubber-like polymer in the form of flaky shreds. The rubber-like polymers prepared in experiments A and B were used to make polymeric compositions consisting of a blend of a rubbery copolymer and a hard copolymer of styrene and acrylonitrile by placing a charge of 350 grams of the rubber-like copolymer and 1050 grams of a thermoplastic copolymer of 70 percent by weight of styrene and 30 percent of acrylonitrile, which copoly had a viscosity characteristic of 12 centipoises at 25° C. (10 weight percent solution of the copolymer in methyl ethyl ketone), in a Banbury mixer and compounding the polymeric ingredients at a temperature of 350° F. under a blanket or atmosphere of nitrogen for a period of 10 minutes. Thereafter, the composition was removed from the mixer, allowed to cool and was ground to a granular form. Portions of the composition were injection molded to form test pieces and the test pieces used to determine properties for the composition, employing procedures similar to those employed in Example 1. The compositions had the properties:

| Rubber-like copolymer | A | B |
| --- | --- | --- |
| Tensile strength, lbs./sq. in | 6,340 | 6,700 |
| Elongation, percent | 16.1 | 14.2 |
| Notched impact strength, ft.-lbs | 4.3 | 12.3 |
| Heat distortion temperature, ° C | 84 | 91 |
| Rockwell hardness (15x) | 124–172 | 118–168 |
| Flow temperature, ° F | 485 | 475 |
| Color | Light tan | Light ivory |

Similar compositions were prepared by milling a charge of 250 grams of the rubber-like copolymer with 750 grams of the thermoplastic styrene acrylonitrile copolymer on a pair of internally heated 6 x 13 inch rolls, one of which rolls was heated at a temperature of 360° F. and the other at 260° F., for a period of 6 minutes in air. Thereafter, the material was sheeted out, allowed to cool, ground to a granular form and molded into test pieces and the properties determined for the composition employing procedures similar to those employed in Example 1. The compositions prepared by compounding the polymeric ingredients with one another in air had the properties:

| Rubber-like copolymer | A | B |
|---|---|---|
| Tensile strength, lbs./sq. in | 5,790 | 6,420 |
| Elongation, percent | 24.1 | 11.6 |
| Notched impact strength, ft.-lbs | 3.4 | 7.6 |
| Heat distortion temperature, ° C | 82 | 85 |
| Rockwell hardness (15x) | 126–173 | 122–172 |
| Flow temperature, ° F | 490 | 480 |
| Color | Tan | Ivory |

EXAMPLE 11

In each of two experiments a mixture of monomers as hereinafter stated was polymerized in aqueous emulsion employing the recipe:

Ingredients: Parts by weight
Monomers _____ 100
Water _____ 125
Sulfonate AA9 (dodecylbenzene sulfonate, sodium salt, 30 percent paste) _____ 2
Tert.-dodecyl mercaptan _____ 0.2
NaHCO$_3$ _____ 1
Potassium persulfate _____ 1.5

In experiment A the monomers were a mixture of 60 percent by weight of butadiene and 40 percent by weight of acrylonitrile. In experiment B the monomers were a mixture of 60 percent of butadiene, 20 percent of acrylonitrile and 20 percent of methyl isopropenyl ketone. The ingredients were charged to a reaction vessel and the mixture agitated to effect emulsification. The emulsion was heated at a temperature of 60° C. with mild agitation under the autogenous pressure of the mixture of the materials until the monomers were polymerized. The product was obtained as a synthetic latex. The latex was heated at a temperature of 100° C. while bubbling steam at atmospheric pressure through the latex to decompose residual amounts of the potassium persulfate catalyst. Thereafter, there was mixed with the latex 2 percent by weight, based on the weight of the polymer, of tris-(para-dodecylphenyl) phosphite and 2 percent of N,N,N',N'-tetra-(2-hydroxypropyl) ethylene diamine, as stabilizing agents, by dispersing the compounds in water containing a small amount of an emulsifying agent and adding the aqueous emulsion to the latex. Thereafter, the latex was dried by spreading a layer of the same on rolls heated at a temperature of 150° C., evaporating the water and scraping the dried latex solids from the rolls.

The product was a rubber-like polymer in the form of flaky shreds. The rubber-like polymers prepared in experiments A and B were used to make polymeric compositions consisting of a blend of a rubbery copolymer and a thermoplastic copolymer of 70 percent by weight of styrene and 30 percent of acrylonitrile, which copolymer had a viscosity characteristic of 12 centipoises at 25° C. (10 weight percent solution of the copolymer in methyl ethyl ketone).

In the experiments a charge of the copolymer of 70 percent by weight of styrene and 30 percent of acrylonitrile and the rubbery copolymer as stated in the following table was compounded on a pair of 3-inch diameter by 8 inches long laboratory rolls, one of which rolls was heated at a temperature of 390° F. and the other at 290° F., for a period of 6 minutes. Thereafter two percent by weight of tri-(2-ethylhexyl)phosphate, based on the sum of the weights of the polymers, was added to the heat-plastified mass as plastizer. The resulting mixture was compounded on the rolls for a period of 10 minutes to obtain a uniform composition. The compositin was removed from the rolls and allowed to cool to room temperature, then was cut to a granular form suitable for molding. Portions of the product were injection molded to form test bars of ½ x ⅛ inch cross section by 6½ inches long. These test bars were used to determine the notched impact strength for the composition employing procedure similar to that described in ASTM D256–47T. Table VI identifies the composition by naming the polymeric ingredients and giving the proportions of monomers employed in making the same. The table also gives the proportions of the hard copolymer and the rubbery copolymer employed in making the composition and gives the notched impact strength determined for the composition at different temperatures.

Table VI

| Run No. | Starting materials | | | | | | | Product | | | |
|---|---|---|---|---|---|---|---|---|---|---|---|
| | Hard polymer | | Rubbery polymer | | | Hard polymer, percent | Rubbery polymer, percent | Notched impact strength ft.-lbs. at— | | | Heat distortion temp., ° C. |
| | Styrene, percent | VCN, percent | C$_4$H$_6$, percent | VCN, percent | MIK, percent | | | 73° F. | 0° F. | −20° F. | |
| 1 | 70 | 30 | 60 | 40 | 0 | 75 | 25 | 2.4 | 0.7 | 0.5 | 84 |
| 2 | 70 | 30 | 60 | 20 | 20 | 75 | 25 | 11.1 | 1.9 | 1.1 | 87 |
| 3 | 70 | 30 | 60 | 40 | 0 | 50 | 50 | 12.8 | 5.8 | 1.3 | 75 |
| 4 | 70 | 30 | 60 | 20 | 20 | 50 | 50 | 14.0 | 17.4 | 13.9 | 81 |

We claim:
1. A composition of matter consisting essentially of from 45 to 80 percent by weight of a normally hard thermoplastic copolymer of from 70 to 90 percent by weight of at least one monoalkenyl aromatic hydrocarbon having a single benzene nucleus and having a single unsaturated radical selected from the group consisting of the vinyl radical and the isopropenyl radical directly attached to a carbon atom of the aromatic nucleus and correspondingly from 30 to 10 percent of acrylonitrile, intimately incorporated with from 55 to 20 percent of a ternary elastomeric copolymer of from 60 to 80 percent by weight of butadiene, from 10 to 30 percent of acrylonitrile and from 10 to 25 percent of an unsaturated ketone having the general formula:

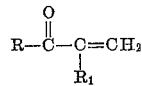

wherein R is an alkyl radical containing from 1 to 2 carbon atoms and R$_1$ is a member of the group consisting of hydrogen and the methyl radical, said polymeric ingredients being intimately incorporated with one another to form a homogenous composition containing from 12 to 33 percent by weight of chemically combined butadiene, based on the total weight of the polymeric ingredients, said elastomeric copolymer having an insoluble gel content between 50 and 98 percent by weight of the copolymer and a Mooney number of from 30 to 150 and containing the acrylonitrile and the unsaturated ketone in a ratio to one another between 0.5:1 and 3:1.

2. A composition as claimed in claim 1, wherein the unsaturated ketone is methyl vinyl ketone.

3. A composition as claimed in claim 1, wherein the unsaturated ketone is methyl isopropenyl ketone.

4. A composition as claimed in claim 1, wherein the hard thermoplastic copolymer is a copolymer of styrene and acrylonitrile.

5. A composition as claimed in claim 1, wherein the hard thermoplastic copolymer is a copolymer of vinyltoluene and acrylonitrile.

6. A composition as claimed in claim 1, wherein the hard thermoplastic copolymer is a copolymer of styrene, alpha-methyl styrene and acrylonitrile.

7. A composition of matter consisting essentially of from 45 to 80 percent by weight of a normally hard thermoplastic copolymer of from 70 to 90 percent by weight of styrene and from 30 to 10 percent of acrylonitrile intimately incorporated with from 55 to 20 per cent of an elastomeric copolymer of approximately 60 percent by weight of butadiene, 20 percent of acrylonitrile and 20 percent of methyl isopropenyl ketone said elastomeric copolymer having an insoluble gel content between 60 and 85 percent by weight of the copolymer and a Mooney number of from 40 to 125.

8. A composition as claimed in claim 7, wherein the hard thermoplastic copolymer is a copolymer of approximately 70 percent by weight of styrene and 30 percent of acrylonitrile.

9. A composition of matter consisting essentially of from 45 to 80 percent by weight of a normally hard thermoplastic copolymer of from 70 to 90 percent by weight of a mixture of styrene and alpha-methyl styrene and from 30 to 10 per cent of acrylonitrile intimately incorporated with from 55 to 20 per cent of an elastomeric copolymer of approximately 60 percent by weight of butadiene, 20 percent of acrylonitrile and 20 percent of methyl isopropenyl ketone, said elastomeric copolymer having an insoluble gel content between 60 and 85 percent by weight of the copolymer and a Mooney number of from 40 to 125.

10. A composition as claimed in claim 9, wherein the hard thermoplastic copolymer is a copolymer of approximately 30 percent by weight of acrylonitrile and 70 percent of a mixture of styrene and alpha-methyl styrene.

11. A composition of matter consisting essentially of from 45 to 80 percent by weight of a normally hard thermoplastic copolymer of approximately 70 percent by weight of vinyltoluene and 30 percent of acrylonitrile intimately incorporated with from 55 to 20 percent of an elastomeric copolymer of approximately 60 percent by weight of butadiene, 20 percent of acrylonitrile and 20 percent of methyl isopropenyl ketone, said elastomeric copolymer having an insoluble gel content between 60 and 85 percent by weight of the copolymer and a Mooney number of from 40 to 125.

12. A composition of matter consisting essentially of from 45 to 80 percent by weight of a normally hard thermoplastic copolymer of approximately 70 percent by weight of styrene and 30 percent of acrylonitrile intimately incorporated with from 55 to 20 percent of an elastomeric copolymer of approximately 60 percent by weight of butadiene, 20 percent of acrylonitrile and 20 percent of methyl vinyl ketone, said elastomeric copolymer having an insoluble gel content between 60 and 85 percent by weight of the copolymer and a Mooney number of from 40 to 125.

13. A composition of matter consisting essentially of from 45 to 80 percent by weight of a normally hard thermoplastic copolymer of approximately 85 percent by weight of styrene and 15 percent of acrylonitrile intimately incorporated with from 55 to 20 percent of an elastomeric copolymer of approximately 80 percent by weight of butadiene, 10 percent of acrylonitrile and 10 percent of methyl isopropenyl ketone, said elastomeric copolymer having an insoluble gel content between 60 and 85 percent by weight of the copolymer and a Mooney number of from 40 to 125.

References Cited in the file of this patent

UNITED STATES PATENTS

| | | |
|---|---|---|
| 2,439,202 | Daly | Apr. 6, 1948 |
| 2,614,093 | Wheelock | Oct. 14, 1952 |
| 2,925,399 | Schneider et al. | Feb. 16, 1960 |

FOREIGN PATENTS

| | | |
|---|---|---|
| 644,022 | Great Britain | Oct. 4, 1950 |